United States Patent [19]

Albizzati et al.

[11] Patent Number: 4,771,115

[45] Date of Patent: Sep. 13, 1988

[54] PROCESS FOR THE PREPARATION OF POLYACETYLENE

[75] Inventors: Enrico Albizzati, Arona; Michele Petrera; Giovanni Giunchi, both of Novara, all of Italy

[73] Assignee: Montedison S.p.A., Milan, Italy

[21] Appl. No.: 921,145

[22] Filed: Oct. 21, 1986

Related U.S. Application Data

[63] Continuation of Ser. No. 823,645, Jan. 29, 1986, abandoned.

[30] Foreign Application Priority Data

Jan. 30, 1985 [IT] Italy .............................. 19306 A/85

[51] Int. Cl.$^4$ ........................ C08F 4/64; C08F 138/02
[52] U.S. Cl. .................................. 526/163; 526/165; 526/285
[58] Field of Search .................. 526/163, 165, 285

[56] References Cited

U.S. PATENT DOCUMENTS

| 3,119,799 | 1/1964 | Natta et al. | 526/285 |
| 3,475,394 | 10/1969 | Malsumura et al. | 526/163 |
| 4,452,959 | 6/1984 | Kobayashi et al. | 526/285 |
| 4,496,702 | 1/1985 | Bott et al. | 526/285 |

FOREIGN PATENT DOCUMENTS

| 0045905 | 2/1982 | European Pat. Off. | |
| 65-09160 | 3/1966 | Netherlands | 526/163 |
| 2126592 | 3/1984 | United Kingdom | 526/285 |

OTHER PUBLICATIONS

Ito et al., Journal of Polymer Science, vol. 12, No. 1, (1974) pp. 11–20.

Primary Examiner—Edward J. Smith
Attorney, Agent, or Firm—Stevens, Davis, Miller & Mosher

[57] ABSTRACT

Polyacetylene having an apparent density at 20° C. greater than 0.6 g/ccm and a surface area below 60 m$^2$/g is prepared by polymerizing gaseous acetylene in the presence of a catalytic system consisting of:
(a) an oxygenized compound of Ti or V, containing at least one metal-oxygen bond;
(b) an organometallic compound of aluminum containing at least one hetero-atom, of the formula:

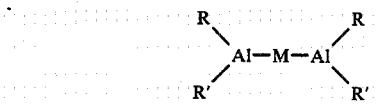

wherein:

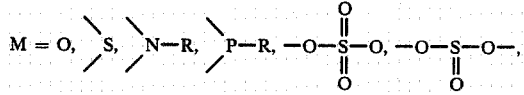

while R=a hydrocarbon radical with 1–18 carbon atoms, and where R'=R, or halogen or alcoxyl.

2 Claims, No Drawings

PROCESS FOR THE PREPARATION OF POLYACETYLENE

This is a continuation of application Ser. No. 823,645, filed Jan. 29, 1986, now abandoned.

BACKGROUND OF THE INVENTION

It is quite known already to prepare acetylene polymers by using a catalytic system consisting of a compound of a transition metal and of an organometal compound of the elements of groups 1A, 2A, and 3A of the Periodic System.

A preparation of this type is found described for the first time by G. NATTA et al. in 'Rend. Acc. Naz. Lincei, Scienze Fis. Mat. Nat.: 25, 3 (1958), according to which crystalline acetylene polymers are obtained in the form of a powder by using catalysts based on titanium and aluminum trialkyl alcoholates.

More particularly there is known the possibility of obtaining the polyacetylene directly in the polymerization in the form of a film (T. Iyo, H. Shirakawa & S. Ikeda, J. Polym. Sci. Polym. Chem., Ed. 13, 11 (1974).

This method is preferred in general even if with the same it is not possible to obtain films with good mechanical properties.

In the published Italian Patent Appl. No. 22722 A/82 there are described new polyacetylene films endowed with particular characteristics, such as the elongation at break, the breaking load and the molecular orientation under stretch. Such films are prepared by using as catalysts special titanium compounds, mainly dialcoxy-dicresoxy titanium in combination with aluminum trialkyls. In general, the values of apparent density of the polyacetylene prepared according to the known methods of the Prior Art prove to be comprised between 0.4 and 0.5 g/cc, with values of the surface area greater than 70 m$^2$/g.

A considerable drawback of the polyacetylenes prepared so far is represented by their instability to oxidation, which considerably reduces the possibility of their being used, for instance, in the manufacture of electrodes for primary and secondary batteries.

THE PRESENT INVENTION

It has now surprisingly been found by the Applicant that it is possible to obtain polyacetylene endowed with improved characteristics, especially as far as the stability to oxidation is concerned, by just conducting the polymerization of the acetylene in the presence of a catalytic system consisting of:

(1) an oxygenized titanium or vanadium compound containing at least one metal-oxygen bond.

(2) an organometal aluminum compound containing at least one hetero-atom, of the formula:

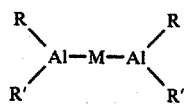

wherein:

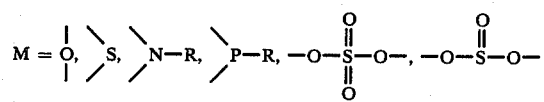

R may be a hydrocarbon radical with 1–18 carbon atoms,

R' may be equal to R or may be a halogen or an alcoxyl.

Preferably the molar ratio between component 2 and component (1) is comprised between 10 and 1.

Examples of preferred compounds of point (1) are: Ti(OC$_2$H$_5$)$_4$; Ti(O-n.C$_4$H$_9$)$_4$; Ti(O-i.C$_3$H$_7$)$_4$; Ti(OC$_6$H$_5$)$_4$; Vo(OC$_2$H$_5$)$_3$; V(O-i.C$_3$H$_7$)$_4$; VO(O-i.C$_3$H$_7$)$_3$; V-triacetylacetonate.

Examples of preferred compounds of point (2) are:

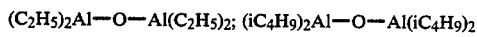

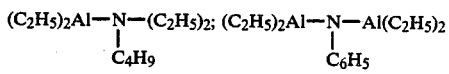

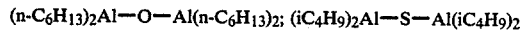

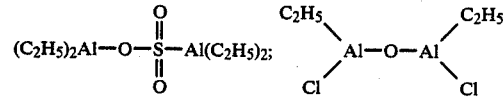

The polymerization conditions of the acetylene with the above cited catalytic system include temperatures varying from −100° C. to +100° C., but which are preferably comprised between −80° C. and +30° C., under pressures of the monomer comprised between 0.01 and 2 atmospheres.

The polyacetylene thus obtained in general will occur in the form of films of a thickness comprised between 5 microns and 1 mm. This polyacetylene shows apparent density values at 20° C. greater than 0.6 g/cm$^3$, and surface area values below 60 m$^2$/g. The percentage of polymer in the cis-form is greater than 90%, when polymerizing the monomer at a temperature of −78° C.

One of the objects of the present invention is thus that of providing a polyacetylene endowed with an apparent density greater than 0.6 g.cu.cm and having a surface area below 60 m$^2$/g.

A further object of this invention is that of providing a process for the preparation of polyacetylene, said process consisting in polymerizing acetylene in a gaseous state in the presence of the above defined catalytic system.

The process according to the present invention is suited for the preparation of polyacetylene both in the form of a film as well as in the form of either powder, gel or in a spongy form.

The following examples are given in order to further illustrate the inventive idea of the present invention without thereby meaning whatsoever limitation to its inventive scope.

EXAMPLE 1–5

Into a test tube of 250 ml holding capacity, and under a nitrogen atmosphere, were introduced in the given order: 3 m. Mols of Ti(OC$_4$H$_9$)$_4$ and 12 m.Mols of aluminum compounds in a 0.5M. heptanic solution. In example 1, given for comparative purposes, there was used triethylaluminum which is a co-catalyst usually employed in the Prior Art. In examples 2-5 there have been used aluminum compounds containing a heteroatom, as indicated in the invention.

The above said solution was allowed to age for 1 (one) hr. at 25° C., whereupon the solvent was evaporated under vacuum until attaining a titanium concentration of 0.5M/l.

The test tube was then cooled down, while keeping the same under vacuum, down to −78° C., whereafter its walls were homogeneously coated with the catalyst. Into the test tube acetylene was then introduced, under a pressure of 750 mm/Hg. This causes the immediate formation of the polymer.

After 1 hour the polymerization was interrupted by discharging the acetylene and replacing it with nitrogen. The film, that showed a metallic aspect, thus obtained was then repeatedly washed with n-heptane at −78° and successively with pentane, both previously cooled down.

The film was thereupon dried under vacuum at the same temperature. The catalysts used for the purpose and the characterization of the obtained polymers have been recorded in the included table.

The surface area of the polyacetylenes has been determined according to the BET method; the percentage of cis isomer has been determined according to the method described in Makromol. Chemistry, 5, 311 (1984).

TABLE

| Example No | Co—catalyst | Apparent density (g/cc) | % cis isomer | Surface area (m²/g) |
| --- | --- | --- | --- | --- |
| 1 comparative | Al(C$_2$H$_5$)$_3$ | 0.44 | 90 | 90.6 |
| 2 | [(iC$_4$H$_9$)$_2$Al]$_2$O | 0.80 | >90 | 56.2 |
| 3 | [(n.C$_6$H$_{13}$)$_2$Al]$_2$O | 0.75 | >90 | 49.0 |
| 4 | [(C$_2$H$_5$)$_2$Al]$_2$N(C$_4$H$_9$) | 0.90 | >90 | 54.8 |
| 5 | [(iC$_4$H$_9$)$_2$Al]$_2$N(C$_6$H$_5$) | 0.83 | >90 | 47.6 |

What we claim is:

1. A process for the preparation of polyacetylene having an apparent density greater than 0.6 g/cc and a surface area lower than 60 m²/g consisting in polymerizing gaseous acetylene, at temperatures of from −80° to +30° C., and under a pressure of the gaseous monomer of from 0.01 to 2 atmospheres, in the presence of a catalytic system consisting of:
   (a) a titanium compound selected from the group consisting of tetra ethoxy-, tetra propoxy-, tetra n-butoxy- and tetra phenoxy-titanium; and
   (b) an organometal Al compound having the formula:

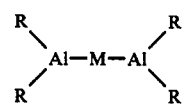

wherein:

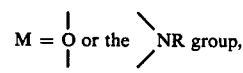

and R=is a hydrocarbon radical having from 1 to 18 carbon atoms, the molar ratio of component (b) to component (a) being between 10 and 1.

2. A process according to claim 1, wherein the polymerization is conducted at a temperature of −78° C.

* * * * *